United States Patent
Lampe et al.

(10) Patent No.: US 11,987,171 B2
(45) Date of Patent: May 21, 2024

(54) METHOD AND SYSTEM FOR REGULATING THE LIGHT EMISSION FROM A VEHICLE LIGHT

(71) Applicant: Volkswagen Aktiengesellschaft, Wolfsburg (DE)

(72) Inventors: Sebastian Lampe, Hasbergen (DE); Christian Studeny, Schoeppenstedt (DE); Annika Bussius, Wolfsburg (DE); Roman Danov, Hannover (DE); Bert Guenther, Berlin (DE); Karl-Wilhelm Gutjahr, Berlin (DE); Ina Petermann-Stock, Wolfsburg (DE); Joscha Roth, Hannover (DE); Mathias Thamm, Oebisfelde (DE); Sebastian Vogler, Wolfsburg (DE); Michael Weng, Berlin (DE)

(73) Assignee: Volkswagen Aktiengesellschaft, Wolfsburg (DE)

(*) Notice: Subject to any disclaimer, the term of this patent is extended or adjusted under 35 U.S.C. 154(b) by 0 days.

(21) Appl. No.: 18/085,967

(22) Filed: Dec. 21, 2022

(65) Prior Publication Data
US 2023/0191984 A1 Jun. 22, 2023

(30) Foreign Application Priority Data
Dec. 22, 2021 (EP) .................................... 21216748

(51) Int. Cl.
*H05B 45/10* (2020.01)
*B60Q 1/14* (2006.01)
*H05B 47/105* (2020.01)

(52) U.S. Cl.
CPC ........... *B60Q 1/1423* (2013.01); *H05B 45/10* (2020.01); *H05B 47/105* (2020.01); *B60Q 2300/45* (2013.01)

(58) Field of Classification Search
CPC .. B60Q 1/1423; B60Q 2300/45; B60Q 5/006; B60Q 1/525; H05B 45/10; H05B 47/105
See application file for complete search history.

(56) References Cited

U.S. PATENT DOCUMENTS 10,906,456 B2   2/2021 Sorokin
2019/0101927 A1* 4/2019 Zhao ...................... G06V 10/82
(Continued)

FOREIGN PATENT DOCUMENTS

DE          9414814 U1    1/1996
DE        102004041429 A1 3/2006
(Continued)

*Primary Examiner* — Minh D A
(74) *Attorney, Agent, or Firm* — Muncy, Geissler, Olds & Lowe, P.C.

(57) ABSTRACT

A method for regulating the light emission from a vehicle light, wherein a road user located in the light emission direction of the vehicle light is detected, and the light emission from the vehicle light is changed, whereupon response data on the response of the road user to the change in the light emission are acquired. Prediction data indicating the response expected from a road user located in the light emission direction of the vehicle light to the changed light emission are determined. The acquired response data are compared with the determined prediction data, if the prediction data deviate from the response data, the adjustment in the light emission from the vehicle light by which a reduction in the deviation is predicted is determined, and the light emission is regulated according to the determined adjustment. Further, the invention relates to a device for carrying out this method.

12 Claims, 2 Drawing Sheets

(56) References Cited

U.S. PATENT DOCUMENTS

| | | |
|---|---|---|
| 2020/0342757 A1 | 10/2020 | Moteki et al. |
| 2021/0046862 A1 | 2/2021 | Wang |
| 2021/0114514 A1 | 4/2021 | Karol |
| 2021/0261047 A1 | 8/2021 | Claesson et al. |
| 2021/0325176 A1* | 10/2021 | Awai .................... G06T 7/0002 |

FOREIGN PATENT DOCUMENTS

| | | |
|---|---|---|
| DE | 102016216680 A1 | 3/2018 |
| DE | 102017207097 A1 | 10/2018 |
| DE | 102018220791 A1 | 6/2020 |
| DE | 102019200913 A1 | 7/2020 |
| WO | WO2020013754 A1 | 1/2020 |
| WO | WO2020087352 A1 | 5/2020 |

* cited by examiner

METHOD AND SYSTEM FOR REGULATING THE LIGHT EMISSION FROM A VEHICLE LIGHT

This nonprovisional application claims priority under 35 U.S.C. § 119(a) to European Patent Application No. 21216748, which was filed on Dec. 22, 2021, and which is herein incorporated by reference.

BACKGROUND OF THE INVENTION

Field of the Invention

The present invention relates to a method for regulating the light emission from a vehicle light. Further, the invention relates to a system for regulating the light emission from a vehicle light.

Description of the Background Art

Vehicle lights are used, among other things, to draw the attention of traffic to changes in driving behavior and to warn of dangerous situations. Traffic following behind can be alerted to a braking deceleration of the vehicle, for example, by the lighting up of a brake light. With adaptive vehicle lights, the light emission can be adjusted according to the traffic situation. This can increase the visibility of a vehicle in a potentially dangerous situation and road safety is improved thereby. For example, another brake light can be added to the brake light during emergency braking. Furthermore, environmental information can be incorporated into the adaptive adjustment. However, an adjustment of the light emission from a vehicle light according to the traffic situation cannot always be interpreted unambiguously.

A method for controlling a lighting system of a vehicle is known from WO 2020/087352 A1. Environmental information, such as objects in the vehicle's environment and a distance from an object in the environment to the vehicle, is collected, and based on this environmental information, an automatic adjustment of the vehicle's lighting system is made. An artificial intelligence can be used to analyze the environmental information.

DE 10 2004 041 429 A1 describes a method for controlling a rear fog light of a vehicle, wherein external data are used to automatically determine whether the rear fog light is switched on or off or maintained in its switching state. By means of an approximated target switching state determined by artificial intelligence, the maximum speed is limited by automatic intervention in the engine control system if visibility falls below a specified range.

Finally, a method for controlling a vehicle lighting device is known from WO 2020/013754 A1. In this regard, the characteristics of the various headlights can be adapted to the weather. An external control center can receive tasks from an operator via a user interface and carry them out via an artificial intelligence.

The disadvantage of these devices and methods is that, despite adaptive regulation of the light emission, the light function of the light emission is insufficiently perceived and interpreted by other road users.

SUMMARY OF THE INVENTION

It is therefore an object of the present invention to provide a method and a device with which an adaptive light emission is better perceived and interpreted by other road users.

In the method of the invention, a road user located in the light emission direction of the vehicle light is detected. The light emission from the vehicle light is changed, whereupon response data on the road user's response to the change in the light emission are acquired. Prediction data indicating the response expected to the changed light emission are determined. The acquired response data are compared with the determined prediction data, and if the prediction data deviate from the response data, the adjustment in the light emission from the vehicle light by which a reduction in the deviation is predicted is determined. The light emission from the vehicle light is regulated according to the determined adjustment.

A light emission change can affect a taillight, brake light, direction indicator, and reverse light (taillight assembly) or high-mounted brake lights, a separate direction indicator, a front light, or a sidelight. The detected road user can be, for example, a driver of another motor vehicle, a cyclist, or a pedestrian. This road user can be located in front of, behind, or next to the vehicle at a distance defined by a detection radius of the vehicle.

The response data provide information on the response of the detected road user to a change in the light emission. For example, they may contain data from a distance measurement to another road user.

Prediction data describe data generated in particular during the method and contain information about the desired behavior of road users in response to a change in the light emission. For example, if there is an increase in the intensity of the brake light, an increase in the distance between the vehicle and the detected road user would be expected.

Accordingly, a deviation of the prediction data from the response data can exist, for example, when the distance has not increased although an increase in distance would be expected due to the changed light emission. The regulation of the light emission in response to a change in the light emission can be performed repeatedly in succession until the deviation of the prediction data from the response data is within a tolerance range.

The method advantageously adjusts the setting of the vehicle light independently based on the comparison of the measured response data of the road users and the prediction data.

By acquiring the response data, the regulation can advantageously be better adapted to the individual manner with which the detected road user reacts. For example, a first road user very quickly detects a braking process of the vehicle in front, in which the brake light is illuminated with low light intensity, which is why no further adjustment is necessary. A second road user reacts more slowly in such a case, for example. Because the response data then do not match the prediction data, a regulation takes place, for example, an increase in the intensity of the light emission from the brake light. In this way, the driver advantageously does not have to additionally pay attention to how other road users react to the change in the light emission of his own vehicle in the flow of traffic or in dangerous situations.

The regulation can be started not only by manually changing the light emission from the vehicle light. It is also activated when there has been an automatic change in the light emission from the vehicle light, for example, when a dangerous situation has been detected and the light emission from the vehicle light was changed automatically, even before the driver has reacted to it.

Environmental data can be acquired from the vehicle's environment and a level for the hazard severity in the environment is determined by means of the environmental data. When the light emission from the vehicle light is changed, the light intensity of the light emission from the vehicle light is changed depending on the determined hazard severity, so that the light intensity of the light emission from the vehicle light is adjusted according to the level of hazard severity.

A front camera for observing the traffic environment or a sensor system for observing rear traffic, for example, a rear radar, ultrasound, a rear camera, or LIDAR, can be set up in the vehicle for this purpose. The relative or absolute positions of the road user can also be measured and transmitted using GPS sensors. Thus, the environmental data can comprise, for example, image data from a camera, measurement data from a LIDAR sensor, measurement data from a radar sensor, and measurement data from an ultrasonic sensor. In addition, measurement data from a rain sensor, measurement data from a brightness sensor, measurement data from a temperature sensor, measurement data from a humidity sensor, and/or measurement data from an air pressure sensor can be taken into account.

By means of the sensor system for acquiring environmental data, in particular the other road user located in the light emission direction of the vehicle light can also be detected, namely, independently of the equipment of the vehicle of the other road user. Further, response data can also be acquired in this way, i.e., the response of the other road user to a change in the light emission.

The calculation of the level of hazard severity can comprise information about delaying traffic, a tail end of a traffic jam, an accident, impaired visibility due to fog, and difficult driving conditions due to severe weather. Furthermore, information about the speed of the vehicle or the other road users or their distance to each other can be used for the calculation. The individual information can also be categorized based on its severity. For example, the distance to the tail end of the traffic jam or the strength of the fog can be taken into account. A level of hazard severity is then determined from the information obtained via the environmental data.

In this context, the light intensity of the light emission from the vehicle light can be understood to mean in particular the luminous flux, i.e., how much light perceivable by the human eye the light source emits per unit time. The luminous flux corresponds to the physical radiant power, but additionally takes into account the sensitivity of the human eye.

If the light intensity of the light emission from the vehicle light is changed as a function of the determined hazard severity, this means in particular that a low light intensity is selected for a low hazard severity, but a high light intensity is selected for a high hazard severity.

Advantageously, the road user recognizes which hazard level is present due to the adjustment of the light intensity to the hazard severity. For example, if the initial speed is low, the distance is great, and there is only weak braking due to slightly decelerating traffic, a low hazard severity is calculated and a low light intensity is selected. This prevents abrupt braking by the road users following behind, which in turn can lead to accidents or impair the flow of traffic. On the other hand, a high hazard severity is calculated and a high light intensity is selected, for example, in the case of high speeds, severe weather, and hard braking. In this way, the road user is warned and can initiate a harder braking process.

The light emission is thus advantageously regulated without the driver's intervention in such a way that the visibility of a vehicle in a dangerous situation is increased and that warnings and/or alerts are optimally detected by the changing lighting, as a result of which road safety can be increased.

When the light emission from the vehicle light is changed, the light intensity is continuously increased from an initial light intensity to the light emission corresponding to the level of hazard severity.

A continuous increase in light intensity may be understood to be a steadily monotonically increasing change in light intensity. For example, when adjusting the light emission in a dangerous situation from a low to high level of hazard severity, it is not abruptly increased from a low light intensity to a high light intensity but continuously. Advantageously, the other road user is not dazzled by the strong increase in intensity and this avoids that he is surprised, which reduces the risk of accidents.

The dynamic course of the situation can also be transmitted by the adaptive adjustment of the light intensity. For example, if the driver detects a traffic jam and brakes slowly, a warning is given only with a low light intensity, e.g., in the form of a small illuminated area or low brightness. If, however, the braking intensity increases in the course of this braking process because it appears to the driver that he is approaching the tail end of the traffic jam more quickly than expected, the intensity level is continuously increased with an increased braking intensity.

The adjustment of light intensity can also affect the front light or other vehicle lights, for example, if the road user is a pedestrian.

The brightness in the environment of the vehicle light can be detected and, when the light emission from the vehicle light is changed, the brightness of the light emission from the vehicle light is changed in such a way that a certain contrast between the brightness of the light emission from the vehicle light and the detected brightness in the environment of the vehicle light is achieved.

Ambient brightness can be measured with sensors at the rear of the vehicle as well as in the entire traffic environment, especially in the area of rear traffic. When the ambient brightness is compared with the brightness of the light emission from the vehicle light, a contrast can be determined between them. Contrast is understood to be the difference in intensity between the ambient brightness and the brightness of the light emission from the vehicle light.

The brightness of the light emission from the vehicle light is in particular the luminance of the light emission surface of the vehicle light. The luminance takes into account the dependence of the location and direction of the luminous flux emitted by the vehicle light. It indicates the surface brightness with which the eye perceives an area of the vehicle light.

Advantageously, the road user should clearly recognize the light emission from the vehicle light, so the contrast should be correspondingly high. However, too high a contrast is detrimental, as this could dazzle road users.

Accordingly, if the ambient brightness is high, for example, due to intense sunshine, the brightness of the light emission from the vehicle light set by default will only achieve a low contrast. The road user can therefore perceive the light emission from the vehicle light more poorly. To improve the detectability of the vehicle light, an increase in brightness is necessary. This ensures that the signal function of the vehicle light can be guaranteed, especially in a dangerous situation. It is unlikely that road users will be dazzled as they are already accustomed to the brightness due to the intense sunlight.

Conversely, at a lower ambient brightness, for example, due to twilight or darkness at night or in a tunnel, the default brightness of the light emission from the vehicle light will achieve a very high contrast. To avoid dazzling the road user, a reduction in brightness is necessary. Especially when the vehicle is stationary during a traffic jam or when driving in a column situation, this persistent glare would be disturbing. The brightness is nevertheless selected so high that it is still ensured that the vehicle light is detected.

A defined contrast is set depending on the level of hazard severity, wherein a greater contrast is set at a higher level of hazard severity.

The adjustment of the contrast depending on the hazard severity can be coupled with the adjustment of the contrast depending on the ambient brightness. In order to generate a defined target contrast that corresponds to the corresponding hazard severity, a higher brightness is required accordingly in the case of high ambient brightness, for example, during the day than, e.g., at night or when driving through tunnels.

This is realized, for example, with a contrast matrix in which the various combinations of low and high brightness and low and high hazard severity are assigned corresponding contrasts. For example, in the case of a high ambient brightness and high hazard severity, maximum contrast would be set; in other words, the brightness of the vehicle light would be correspondingly high. This would achieve a high signal effect in order to optimally warn traffic. In contrast, at a low ambient brightness, for example, in a tunnel, and with a low hazard severity, a minimal signal effect would be sufficient to inform but not dazzle or surprise the road user.

Instances of medium ambient brightness and medium hazard severity are adjusted accordingly. The advantageous effect for the road user can thus be used for all ambient brightnesses and hazard severities.

The vehicle light can have an area with a plurality of illuminating devices and the light intensity is adjusted via the brightness and/or the light emitting area of the vehicle light. The change in light emission can thus be achieved by a change in the intensity of the light emission, therefore, a change in the luminance, therefore, a changed radiant flux per unit area, or be implemented by a larger area with the same luminance.

In particular, the plurality of illuminating devices can be a plurality of light-emitting diodes (LEDs). The light intensity can then be changed in particular by an adaptive intensity control in the individual LEDs.

The vehicle light can also comprise individual LEDs, some of which can be combined to form subsections of the respective lighting device. For example, the rear light can be formed of multiple separate subcomponents. Depending on the signal effect to be achieved, the illuminated area can be reduced or enlarged. An increase in the illuminated area is realized by individually controllable illuminated area elements of the respective lighting device.

In addition or alternatively to the brightness of a defined area of the vehicle light, the size of the light emitting area of the vehicle light can also be adjusted. It can be adjusted both according to the contrast and/or according to the level of hazard severity.

For example, a small illuminated area is activated at a low hazard severity, and a large illuminated area is activated at a high hazard severity. The warning effect is intuitively greater with a larger illuminated area. Traffic can thus be better warned in the event of a high hazard severity, for example, associated with an increased risk of collision. In this case, the brightness of the illuminated area is not changed.

Preferably, both changes in the light emission from the vehicle light, therefore, a change in brightness and a change in the size of the illuminated area of the vehicle light, can be combined. The adjustment can again be made both as a function of the contrast and as a function of the level of hazard severity. For example, in the event of a high hazard severity in a bright environment, both a large illuminated area is activated and an increased brightness is set.

When the light emission from the vehicle light is changed, the illuminated area can be continuously increased from an initial light area to the target illuminated area according to the level of hazard severity.

Different signal combinations, which the road user can intuitively relate to the situation at hand, are thus available for different warning situations and warning levels.

Further, a machine learning method can be used to determine the prediction data. By using a machine learning method, it is advantageously possible to determine particularly reliable prediction data.

Response data can be stored in a database and the response data in the database are used for training the parameter set of the machine learning method for determining the prediction data.

Before the method is used, for example, before the vehicle is delivered, e.g., an artificial intelligence is trained, wherein response data from drivers to a wide variety of driving situations are collected and stored in a database and used for training. During the method, the artificial intelligence which uses the machine learning method can be used to determine in real time which response is expected to which driving situations to create the prediction data therefrom. In addition to the actual response of the driver, the machine learning method also takes into account a wide range of environmental factors. The method can thus produce reliable prediction data for a wide range of driving situations, including those that have not been directly determined beforehand and stored in the database.

Another way of creating the database for determining the prediction data is to constantly store current response data while the vehicle is in use or while the method is being used. The data set available for training the machine learning procedure is therefore expanded with each use of the method. Thus, the determination of the prediction data can be constantly improved; this leads to an optimized setting of the vehicle light and thus to a safer driving situation.

The data sets that were used to determine the prediction data before the method was used can be combined with the current data sets in each case. Thus, driving situations, in particular rare situations as well, already determined beforehand can be included in the database, but the data sets can also be additionally continually expanded to include current driving situations. For example, new developments in traffic situations or unknown environments are also included in this way.

Thus, the use of an artificial intelligence that employs the machine learning method enables automatic detection of a wide variety of environmental factors and overall optimization of settings. It learns which light setting is best for which situations. The situations here include lighting conditions, the surrounding traffic, the driver's actions, and other environmental factors. In particular, the artificial intelligence-based algorithm can learn from the behavior of road users in response to the lighting. These include, for example, a quick reaction or no reaction at all or driving errors due to dazzling.

The large amount of data from different sensors can thus be used advantageously. It will be ensured that the vehicle lighting can be adjusted quickly and that the adjustment is regulated such that an intuitive signal is produced for the driver and for traffic following behind.

The environmental data information can be used for the machine learning method to determine the level of hazard severity from the environmental data. The artificial intelligence learns from the response data whether the assessment of the hazard severity and thus the setting of the vehicle light have led to the desired result or whether the level of hazard severity has been incorrectly assessed.

According to a further embodiment of the method of the invention, the response data are determined from the transmitted data via direct communication between vehicles (car 2 car communication). In this way, for example, the braking activity and/or the steering behavior of the detected road user and/or the eye movements of the driver of the detected road user can be transmitted directly.

As an alternative or in addition to the directly recorded environmental data, data from direct communication between vehicles (car 2 car) can thus be evaluated. For example, it can be determined whether the traffic following behind is also stationary or there is movement in the column. In addition, information about the driver or the vehicle can be transmitted. Advantageously, the environmental data can be expanded hereby to include data that cannot be measured directly by sensors.

The system of the invention for regulating the light emission from a vehicle light comprises a detection unit for detecting road users located in the light emission direction and an adjustment unit for changing the light emission from the vehicle light. Furthermore, the system comprises a computation unit for acquiring response data on the response of the road user to the change in the light emission, for determining prediction data indicating the response expected to the changed light emission, and for comparing the acquired response data with the determined prediction data. A regulating unit is designed, when the prediction data deviate from the response data, to determine which adjustment of the light emission from the vehicle light predicts a reduction in the deviation and to regulate the light emission from the vehicle light according to the determined adjustment.

The system of the invention is used in particular for executing the method of the invention. It has the same advantages as the method of the invention.

For the driver of the vehicle, the calculated and applied setting of the vehicle light can be shown in a combination display in the vehicle. In this way, the driver is informed about which light indicator the other road user sees. The driver can therefore check the correct operation of the regulation and thus the light emission. Furthermore, the driver is warned if the system has generated a danger signal due to a dangerous situation that he himself has not detected or has detected too late. Both increase the safety of the driver and other road users. The representation of the light emission can be visualized, for example, via symbols of the individual lights, which light up as soon as the regulation becomes active. The outwardly applied technique of an enlarged illuminated area and/or an increased brightness of the light emission can be adopted analogously in the display. In the event of particularly high hazard severity, an additional acoustic warning signal can sound.

An increase in energy efficiency automatically follows from all vehicle light control variants mentioned in the method compared to standard vehicle lights without intensity control.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
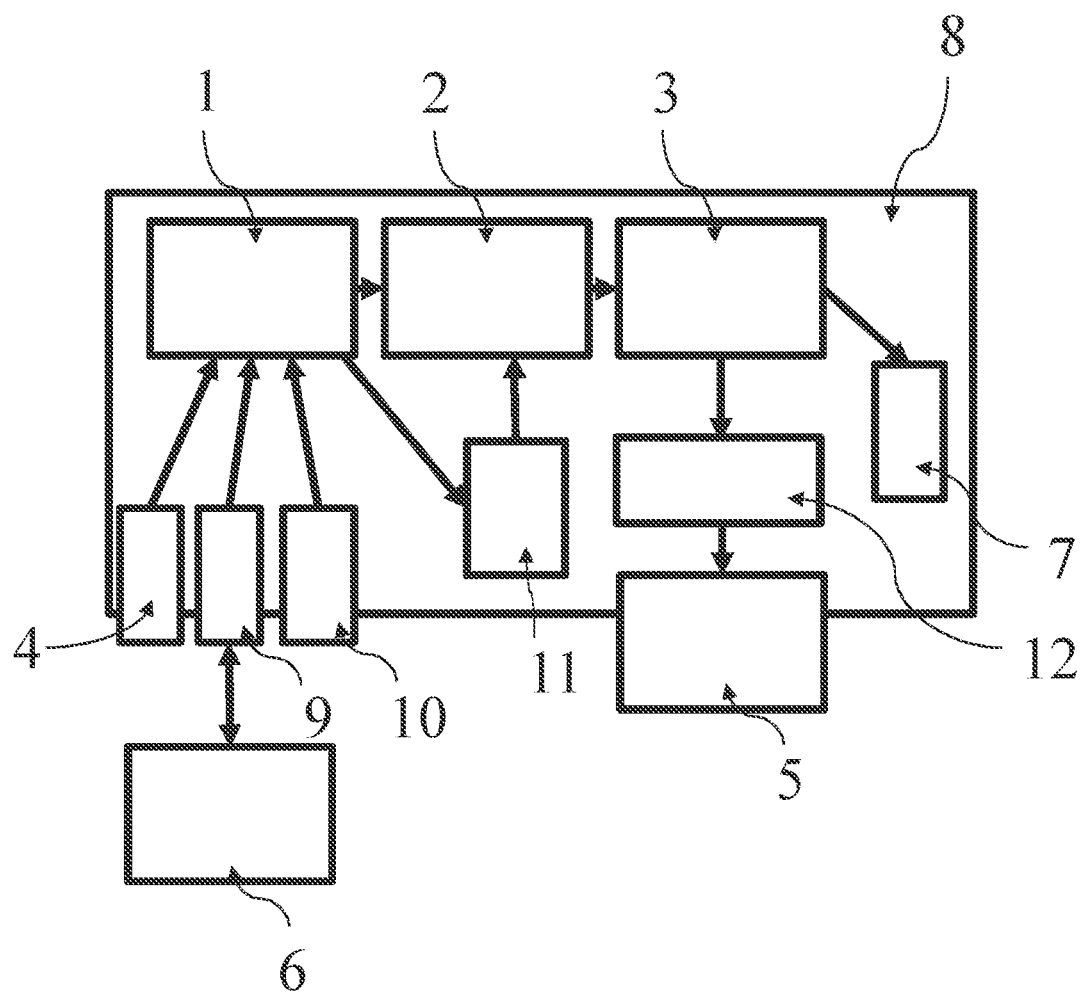
FIG. 1 shows schematically the components of the system.

First, an exemplary embodiment of the device of the invention is explained with reference to FIG. 1:

The device comprises a plurality of environmental sensors 4 disposed in vehicle 8. These can comprise cameras, a LIDAR sensor, a radar sensor, an ultrasonic sensor, a rain sensor, a brightness sensor that measures the ambient brightness in the traffic environment of vehicle 8, a temperature sensor, a humidity sensor, and/or an air pressure sensor. The data acquired by these environmental sensors 4 are transmitted to a detection unit 1 as environmental data.

Further external environmental data of other road users 6 (car 2 car) or of a traffic infrastructure (car2×) are transmitted to detection unit 1 via communication unit 9. Detection unit 1 is also connected to a satellite signal receiver, for example, a GPS (global positioning system) receiver 10, so that the current position of vehicle 8 can be determined. The environmental data received by detection unit 1 are transmitted to a computation unit 2 and further processed by it.

From the environmental data, computation unit 2 calculates response data for the response of road user 6 to a change in the light emission. Furthermore, computation unit 2 creates prediction data indicating the response expected to the changed light emission.

For this purpose, computation unit 2 is connected to an internal or external database 11. Database 11 contains previously collected response data and an artificial intelligence trained beforehand by a machine learning method. The environmental data transmitted to computation unit 2 are used to generate the prediction data by means of the artificial intelligence which uses the machine learning method. The response data determined by means of the environmental data are stored in database 11 in order to expand the data set for the machine learning method.

Computation unit 2 also determines the level of hazard severity from the environmental data. For this purpose, the response data stored in database 11 are used to determine the correct level of hazard severity from previous driving situations using artificial intelligence.

Computation unit 2 is further used to compare the acquired response data with the determined prediction data. The result is transmitted to regulating unit 3, which, if the prediction data deviates from the response data, determines which adjustment of the light emission from vehicle light 5 predicts a reduction in the deviation.

The device further comprises an adjustment unit 12 for changing the light emission from a vehicle light 5. The results of the determined adjustment of the light emission from vehicle light 5 and the corresponding necessary regulation are sent to adjustment unit 12 and the light emission from vehicle light 5 is adjusted by it.

Vehicle light 5 comprises lighting devices for a taillight, brake light, direction indicator, and reverse light (taillight assembly) or a high-mounted brake light, a separate direction indicator, and/or a sidelight. In addition, vehicle light 5 can also be used as a front light. Vehicle light 5 comprises a plurality of individual light emitting diodes (LEDs), some of which are combined into subsections for specific lighting functions. In this way, illuminated area elements can be formed by the LEDs. Adjustment unit 12 controls the individual LEDs of vehicle light 5 depending on the calculated regulation, and in this way changes the light emitting area of vehicle light 5 and the light intensity of the light emission from vehicle light 5.

The adjustment is also transmitted to a display unit 7, which shows the driver the setting of vehicle light 5.

Figure 2:
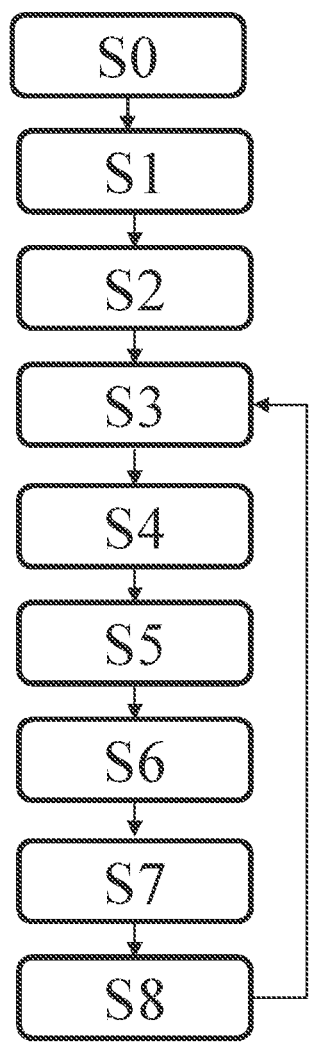
FIG. 2 is a flowchart of the method steps in an example of the method of the invention.

In the following, an exemplary embodiment of the method of the invention is explained with reference to FIG. 2, wherein further details of the exemplary embodiment of the device of the invention are described:

Before execution of the method, in a step S0, the artificial intelligence is trained to determine the level of hazard severity and the prediction data. For this purpose, response data of drivers to different driving situations and associated environmental data are collected, stored in database 11, and used for the training.

During the drive, in a first step S1, a road user 6 located in the light emission direction of vehicle light 5 is detected. Road user 6 is a driver of a motor vehicle in the light emission direction of the brake light, therefore, behind vehicle 8. In another exemplary embodiment, road user 6 can also be a bicyclist or pedestrian and can also be located adjacent to or in front of vehicle 8.

In a second step S2, environmental data are acquired with environmental sensors 4. This step S2 comprises, among other things, measuring the brightness with a brightness sensor, measuring the distance to other road users, and detecting the weather conditions. A level of hazard severity is determined by computation unit 2 from the environmental data. In the exemplary embodiment, the driver is on the highway at high speeds. It is bright but it is raining hard. Due to an accident in the immediate vicinity, the driver has to brake hard. Therefore, a high level of hazard severity is determined. The determination is made with the help of an artificial intelligence that has learned from previous response data and environmental data to estimate the hazard severity and which associated setting of vehicle light 5 is suitable to bring about a desired result, e.g., to warn road users following behind.

In the following third step S3, the light emission from vehicle light 5 is changed with adjustment unit 12. The driver brakes and the brake light comes on. Half of the available LEDs are activated and a medium brightness level is selected. In another exemplary embodiment, the light emission change can also occur, for example, by flashing or turning on the front light.

In the fourth step S4, response data on the response of road user 6 to the change in light emission is acquired by detection unit 1. This information is provided by the sensor system for observing rear traffic, for example, the rear radar, ultrasound, rear camera, or LIDAR, which are covered by the environmental sensors 4. However, it can also be obtained directly by transmitting the braking activity, steering behavior, or eye movement of road user 6 if the latter has a communication interface that can exchange data with communication interface 9 of vehicle 8 (car 2 car). Furthermore, a front camera can be used to observe the traffic environment. In the exemplary embodiment, computation unit 2 determines from the images of the rear camera that road user 6 has not yet initiated a braking process. Here, computation unit 2 can further take into account data from the radar sensor and/or LIDAR sensor.

In a fifth step S5, the response data are stored in database 11 of computation unit 2 to expand the parameter set for the machine learning method. Database 11 comprises already stored response data from other traffic situations, collected either during use of the method or previously.

Prediction data indicating which response is expected to the changed light emission is determined in a sixth step S6. For this purpose, the response data of database 11 are accessed and the prediction data are determined by means of the pre-trained artificial intelligence by means of a machine learning method. The prediction data predict that the road user would have to brake hard in response to the change in light emission.

In a seventh step S7, the response data are compared with the prediction data. In the exemplary embodiment, a non-braking vehicle 8 was acquired as response data and a hard braking vehicle 8 was predicted as prediction data. Accordingly, a deviation of the prediction data from the response data is detected.

Because a deviation was detected, in an eighth step S8, computation unit 2 determines which adjustment of the light emission is predicted to reduce the deviation. On the one hand, the level of hazard severity is included in this regard. Because this was rated as high, efforts are made to increase the illuminated area or to increase the brightness of the LEDs that light up.

On the other hand, the contrast of the light emission from vehicle light 5 in the environment is determined. The brightness detected by the brightness sensor is compared with the currently set brightness of vehicle light 5. The contrast between vehicle light 5 set to the medium brightness level and the ambient brightness is determined. It is found that a better contrast can be achieved with a higher brightness level. The machine learning method generates an optimized light emission setting to match these inputs. In this case, the brightness is increased and the illuminated area is continuously enlarged to the largest possible area.

The calculated and applied setting of vehicle light 5 is shown to the driver in a combination display in vehicle 8. Due to the increased hazard severity, an acoustic warning signal also sounds.

The regulation sequence is now repeated. The new light emission setting is to be equivalent to step S3 described earlier. In the exemplary embodiment, a hard braking process of road user 6 is now detected due to the change in the light emission. The distance between the two vehicles increases. The response data acquired after the new light emission setting is made are stored in database 11 according to step S5 to further improve the machine learning method. In this case, the response data agree with the prediction data within a predefined tolerance range; no further adjustment is therefore necessary and the method is ended.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for regulating light emission from a vehicle light of a vehicle, the method comprising:
    detecting a road user located in a light emission direction of the vehicle light;
    changing the light emission from the vehicle light;
    acquiring response data based on a response of a road user to the change in the light emission;
    determining prediction data indicating a response expected from a road user located in the light emission direction of the vehicle light to the changed light emission;
    comparing the acquired response data with the determined prediction data;
    determining, if the prediction data deviate from the response data, the adjustment in the light emission from the vehicle light by which a reduction in the deviation is predicted; and
    regulating the light emission from the vehicle light according to the determined adjustment.

2. The method according to claim 1, wherein environmental data are acquired from the environment of the vehicle and a level for a hazard severity in the environment is determined via the environmental data when the light emission from the vehicle light is changed, and wherein the light intensity of the light emission from the vehicle light is changed depending on the determined hazard severity, so that the light intensity of the light emission from the vehicle light is adjusted according to the level of hazard severity.

3. The method according to claim 2, wherein when the light emission from the vehicle light is changed, the light intensity is continuously increased from an initial light intensity to the light emission corresponding to the level of hazard severity.

4. The method according to claim 2, wherein a defined contrast is set depending on the level of hazard severity, and wherein a greater contrast is set at a higher level of hazard severity.

5. The method according to claim 4, wherein the vehicle light has an area with a plurality of lights and the light intensity is adjusted via the brightness and/or the light emitting area of the vehicle light.

6. The method according to claim 1, wherein a brightness in the environment of the vehicle light is detected when the light emission from the vehicle light is changed, and wherein the brightness of the light emission from the vehicle light is changed in such a way that a certain contrast between the brightness of the light emission from the vehicle light and the detected brightness in the environment of the vehicle light is achieved.

7. The method according to claim 1, wherein a machine learning method is used to determine the prediction data.

8. The method according to claim 7, wherein response data are stored in a database and wherein the response data in the database are used for training the parameter set of the machine learning method for determining the prediction data.

9. The method according to claim 1, wherein the response data are determined from the transmitted data via car 2 car communication.

10. A system for regulating a light emission from a vehicle light, the system comprising:
    a detection unit to detect a road user located in a direction of light emission;
    an adjuster to change the light emission from the vehicle light;
    a database comprising previously acquired response data; and
    a computation unit to acquire response data based on a response of the road user to the change in the light emission, to determine prediction data indicating the response expected to the changed light emission, and to compare the previously acquired response data with the determined prediction data;
    a regulating unit which is designed, when the prediction data deviate from the response data, to determine which adjustment of the light emission from the vehicle light predicts a reduction in the deviation and to regulate the light emission from the vehicle light according to the determined adjustment.

11. The system according to claim 10, wherein the database further comprises trained response data determined via a machine learning method.

12. The system according to claim 10, wherein the database further comprises environmental data.

* * * * *